(12) United States Patent  (10) Patent No.: US 8,015,825 B2
Elder et al.  (45) Date of Patent: Sep. 13, 2011

(54) FAST ACTING AIRCRAFT ENGINE BLEED AIR CHECK VALVE

(75) Inventors: James Elder, South Windsor, CT (US); Joshua Adams, New Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1362 days.

(21) Appl. No.: 11/741,001

(22) Filed: Apr. 27, 2007

(65) Prior Publication Data
US 2009/0320495 A1  Dec. 31, 2009

(51) Int. Cl.
*F02C 6/04* (2006.01)
(52) U.S. Cl. .......................... 60/785; 137/527
(58) Field of Classification Search .......... 60/782, 60/785, 795, 801; 137/511, 527; 251/305
See application file for complete search history.

(56) References Cited

U.S. PATENT DOCUMENTS

| | | | | |
|---|---|---|---|---|
| 1,306,391 A | * | 6/1919 | Romanoff | 137/512.15 |
| 2,925,825 A | * | 2/1960 | Staiger | 137/514 |
| 4,373,544 A | | 2/1983 | Goodman et al. | |
| 6,237,625 B1 | | 5/2001 | Randolph | |
| 6,659,711 B2 | | 12/2003 | Schofield et al. | |
| 2006/0026965 A1 | * | 2/2006 | Christianson et al. | 60/782 |

FOREIGN PATENT DOCUMENTS

| | | |
|---|---|---|
| GB | 796162 | 7/1955 |
| JP | 58-77979 | 5/1983 |
| WO | 2006/036724 | 4/2006 |

OTHER PUBLICATIONS

European Search Report for Application No. EP 08 25 1395 mailed Jan. 28, 2011.

* cited by examiner

*Primary Examiner* — Louis J. Casaregola
(74) *Attorney, Agent, or Firm* — Carlson, Gaskey & Olds PC

(57) ABSTRACT

An engine air supply system includes an air source, which is a gas turbine engine in one example. A component, such as an environmental control system component, is interconnected to the air source by a conduit that includes a supply flow direction. A check valve is arranged in the conduit. The check valve includes a valve portion moveable in the supply flow direction from a closed position to an open position. The closed position is arranged at an acute angle relative to the supply flow direction. The check valve includes first and second valve portions that are hemi-elliptical in shape. The first and second valve portions are non-planar and arranged approximately 90 degrees apart when in the closed position. The first and second valve portions move toward one another from the closed position to the open position. Each of the first and second valve portions moves approximately 30-40 degrees from the open position to the closed position in response to a stall condition, which significantly reduces the response time and forces generated by the first and second valve portions when closing.

12 Claims, 1 Drawing Sheet

FAST ACTING AIRCRAFT ENGINE BLEED AIR CHECK VALVE

BACKGROUND OF THE INVENTION

This invention relates to an engine air supply system for an aircraft. More particularly, the invention relates to a check valve for use in a gas turbine engine bleed system, for example.

Modern high performance fighter aircraft engines require a fast acting pneumatic check valve to prevent engine core bleed flow from returning to the engine during a compressor stall. Under one typical normal operating condition, bleed flow is extracted from a high pressure compressor stage and is delivered to the airframe for various environmental control system purposes, for example. The bleed flow from the engine can operate at over 40 atmospheres and at over 1100° F. with flows over 1 pps. Compressor stall recovery is adversely affected by any returning bleed flow from the environmental control system, and thus, a fast acting check valve improves surge recovery. Closure times of under 100 ms are typically desired.

Check valves that operate in this type of environment are typically semi-circular centrally hinged discs. The bleed discharge flow maintains the discs in an open position with an included angle of typically around 20 degrees. During a compressor stall when the flow reverses, the discs will move approximately 70 degrees from the open position to the closed position and strike the valve seat. The discs are coplanar in the closed position and perpendicular to the flow direction. The angular velocity at impact may reach many thousands of radians per second as the discs accelerate to the velocity of the air flowing in the reverse direction. Because the velocity at impact is directly related to the backflow air velocity, any reduction in angular travel for the discs to close will reduce the angular velocity on contact with the valve seat. This will both reduce the stress levels on the discs and seat and also reduce the amount of backflow.

One typical approach to addressing the above problem is to reduce the angular velocity by reducing disc travel. This is accomplished by having the discs less open in the open position than the arrangement described above. The included angle is reduced to around 30-40 degrees when in the open position to reduce the angular travel for the discs. The disadvantage of this approach is that under normal operating conditions of forward flow, the pressure drop across the valve will increase. Less pressure is then available for the aircraft systems, which may require larger components to accept the lower pressure or limit operating conditions.

What is needed is a check valve that reduces the stress levels between the discs and seat without increasing the restriction provided by the check valve.

SUMMARY OF THE INVENTION

An engine air supply system includes an air source, which is a gas turbine engine in one example. A component, such as an environmental control system component, is interconnected to the air source by a conduit that includes a supply flow direction. A check valve is arranged in the conduit. The check valve includes a valve portion moveable in the supply flow direction from a closed position to an open position. The closed position is arranged at an acute angle relative to the supply flow direction in one example.

In one example, the check valve includes first and second valve portions that are hemi-elliptical in shape. The first and second valve portions are non-planar and arranged approximately 90 degrees apart when in the closed position, for example. The first and second valve portions move toward one another from the closed position to the open position. In one example, each of the first and second valve portions moves approximately 30-40 degrees from the open position to the closed position in response to a stall condition, which significantly reduces the response time and forces generated by the first and second valve portions when closing as compared to prior art arrangements.

These and other features of the present invention can be best understood from the following specification and drawings, the following of which is a brief description.

DETAILED DESCRIPTION OF THE PREFERRED EMBODIMENT

Figure 1:
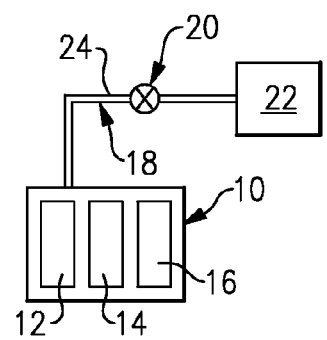
FIG. 1 is a highly schematic view of an engine air supply system.

An engine air supply system is schematically shown in FIG. 1. The system includes a gas turbine engine 10 having a compressor section 12 that provides an air source for a component 22 through a bleed air line 18. The engine 10 includes a combustor 14 arranged between the compressor section 12 and a turbine section 16. Bleed air from the compressor section 12 is provided to the component 22, which may be an environmental control system component. The bleed air line 18 typically includes a check valve 20 arranged in a conduit 24 that automatically closes in response to a surge condition in the compressor section 12. The check valve 20 prevents backflow from the component 22 to the engine 10 when closed.

Figure 2:
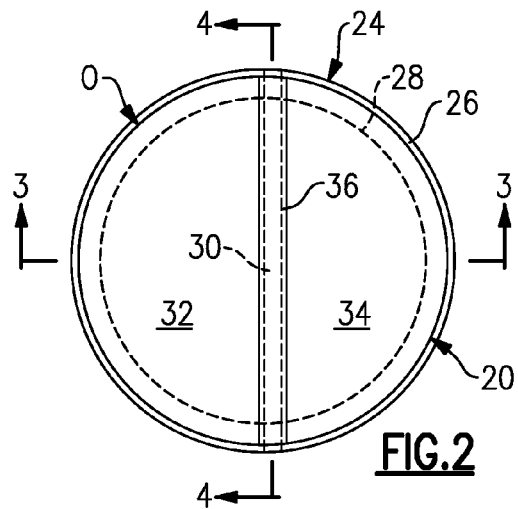
FIG. 2 is a top elevational view of a portion of a conduit of a bleed air line illustrating an example check valve.

In the example shown in FIG. 2, the conduit 24 is provided by a generally cylindrical wall 26. In one example, the wall 26 provides a seat 28. The seat 28 alternatively may be provided by a separate structure, for example. First and second valve portions 32, 34 rotate about a pivot 30 between open and closed positions O, C, best shown in FIGS. 3 and 4. The pivot 30 is provided by a hinge-type joint in one example.

Figure 3:
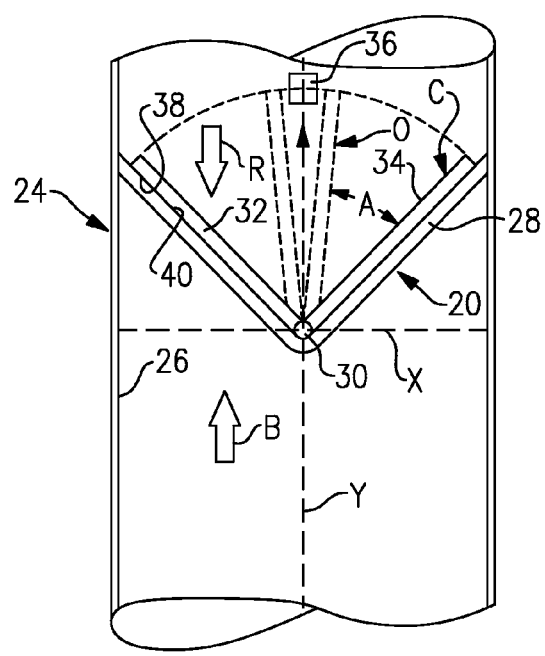
FIG. 3 is a cross-sectional view of the conduit and check valve taken along line 3-3 in FIG. 2.
Figure 4:
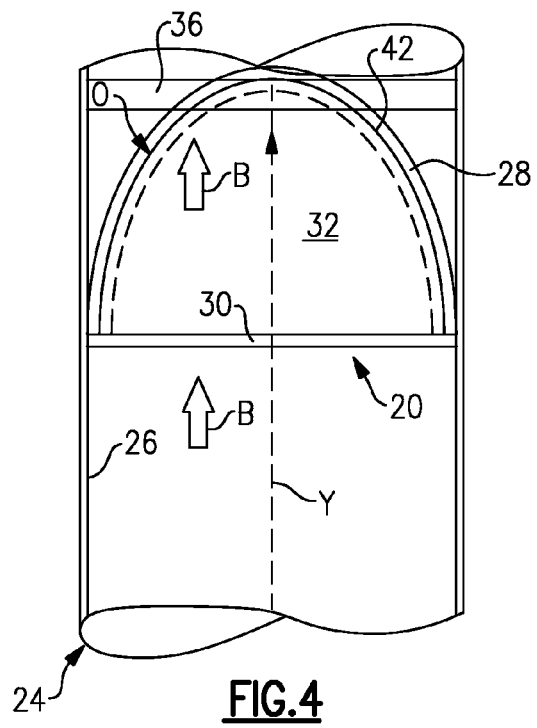
FIG. 4 is a cross-sectional view of the conduit and check valve taken along 4-4 in FIG. 2.

Referring to FIGS. 2 and 3, the conduit 24 provides a supply flow direction along which bleed air B flows from the compressor section 12 to the component 22 when the first and second valve portions 32, 34 are in the open position O (shown in FIGS. 3 and 4). A reverse flow R occurs within the conduit 22 during a surge condition in the compressor section 12, which moves the first and second valve portions 32, 34 from the open position O to the closed position C. A perimeter 42 of the first and second valve portions 32, 34 provides a first surface 38 that seals against a second surface 40 of the seat 28.

In one example, a stop 36 extends between opposite sides of the conduit 24 in the same direction as the pivot 30. The first and second valve portions 32, 34 engage the stop 36 when in the open position O. The first and second valve portions 32, 34 may have an included angle of approximately 10 degrees or less between them in the open position O, which is best illustrated in FIG. 3. It should be understood that the first and second valve portions 32, 34 may be spaced apart any suitable angle when in the open position O. It is typically desirable to have the first and second valve portions 32, 34 relatively close to one another when open to minimize the restriction through the conduit 24.

In the prior art, the seat 28 is circular and arranged in the plane X illustrated in FIG. 3. As a result, the first and second valve portions 32, 34 are required to move approximately 90 degrees from the open position O to the close position C, which generates high velocity and stresses. In the examples, which are best shown in FIGS. 3 and 4, the seat 28 for each of the first and second valve portions 32, 34 are arranged at an acute angle A relative to the supply flow direction Y and non-perpendicular thereto. In one example, the first and second valve portions 32, 34 are non-planar and arranged less than 180 degrees apart in the closed position. In one example illustrated in the figures, the acute angle A is approximately 45 degrees. As a result of the acute angle A, the first and second valve portions 32, 34 are of a hemi-elliptical shape.

The reduced travel required for the example check valve arrangement reduces the velocity and stresses when the first and second valve portions 32, 34 move from the open position O to the closed position C. Moreover, the response time of the check valve 20 is reduced due to the reduced distance the first and second valve portions 32, 34 must move to close.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. An air supply system comprising:
a conduit that includes an air supply flow direction; and
a check valve arranged in the conduit and including a valve portion movable from a closed position to an open position in the supply flow direction, the closed position arranged at an acute angle relative to the supply flow direction, wherein the check valve includes first and second valve portions moveable from the closed position toward one another to the open position, the first and second valve portions arranged in different planes in the closed position, wherein the system further comprises an air source, and wherein the air source is a gas turbine engine compressor section.

2. The system according to claim 1, further comprising a component interconnected to the air source.

3. The system according to claim 2, wherein the component is an environmental control system component.

4. The system according to claim 1, wherein the compressor section includes a stall condition, the valve portion moving from the open position to the closed position in a direction opposite the supply flow direction in response to the stall condition.

5. The system according to claim 1, wherein the first and second valve portions are moveable about a pivot from the closed position to the open position.

6. The system according to claim 1, wherein the first and second valve portions are arranged at approximately 90 degrees relative to one another in the closed position.

7. The system according to claim 1, wherein the first and second valve portions have an included angle of approximately 10 degrees between them when in the open position.

8. The system according to claim 7, comprising a stop arranged between the first and second valve portions in the open position, the first and second valve portions engaging the stop in the open position.

9. The system according to claim 1, wherein the check valve includes a seat, the valve portion including a perimeter sealed against the seat in the closed position, the seat arranged in a non-perpendicular orientation relative to the supply flow direction.

10. The system according to claim 1, wherein the acute angle is approximately 45 degrees.

11. The system according to claim 1, wherein the valve portion travels approximately 30-40 degrees from the closed position to the open position.

12. The system according to claim 1, wherein the valve portion has a generally hemi-elliptical shape.

* * * * *